United States Patent [19]
Seibert et al.

[11] Patent Number: 4,729,610
[45] Date of Patent: Mar. 8, 1988

[54] BRAKE SLIP CONTROL APPARATUS FED WITH AUXILIARY ENERGY FOR USE IN A VEHICULAR HYDRAULIC BRAKE SYSTEM

[75] Inventors: Wolfram Seibert, Pfungstadt; Norbert Ocvirk, Offenbach; Juergen Schonlau, Niedernhausen, all of Fed. Rep. of Germany

[73] Assignee: Alfred Teves GmbH, Frankfurt am Main, Fed. Rep. of Germany

[21] Appl. No.: 908,626

[22] Filed: Sep. 18, 1986

[30] Foreign Application Priority Data

Sep. 18, 1985 [DE] Fed. Rep. of Germany ....... 3533255

[51] Int. Cl.$^4$ .......................... B60T 8/44; B60T 13/00
[52] U.S. Cl. .................................... 303/114; 60/547.1
[58] Field of Search ................ 180/197; 303/113, 114, 303/115, 116, 119; 60/547.1, 548, 589, 591

[56] References Cited

U.S. PATENT DOCUMENTS 4,643,487 2/1987 Neubrand .......................... 303/114

FOREIGN PATENT DOCUMENTS 3232052 3/1984 Fed. Rep. of Germany .

Primary Examiner—Andres Kashnikow
Assistant Examiner—Timothy Newholm
Attorney, Agent, or Firm—James B. Raden; Robert P. Seitter

[57] ABSTRACT

In a brake slip control apparatus fed by auxiliary energy for use in a vehicular hydraulic brake system, copmrising a master cylinder assembly (12) actuatable by the brake pedal, and with auxiliary energy being supplied into the working chamber (16) of the master cylinder, a positioning tube (39) is arranged axially slidable between stops which causes the master cylinder piston (23) to assume a defined position in the event of application with auxiliary energy. To this end, an undular washer (50) is located between the pedal-side end of the positioning tube (39) and the collar or step (51) of the braking pressure generator (1) isolating the master cylinder assembly (12) from a hydraulic brake power booster (11), with the positioning tube (39) being pressed against the undular washer (50) which pressure-tightly closes an intermediate chamber (54) provided between the master cylinder piston (23) and the booster piston (57) enclosed by the step (51) so that the master cylinder piston (23) is hydraulically locked.

6 Claims, 1 Drawing Figure

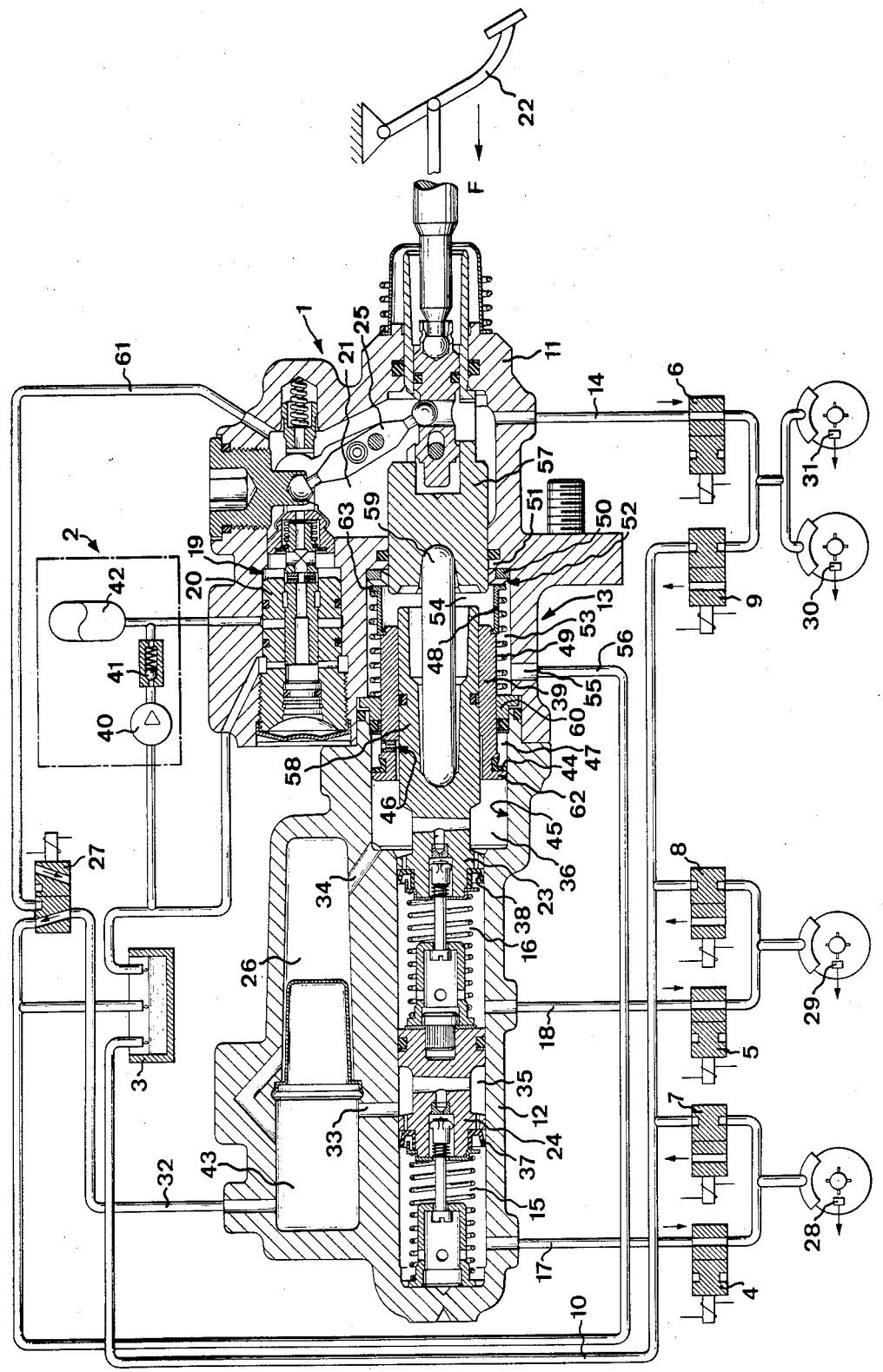

BRAKE SLIP CONTROL APPARATUS FED WITH AUXILIARY ENERGY FOR USE IN A VEHICULAR HYDRAULIC BRAKE SYSTEM

BACKGROUND OF THE INVENTION

The present invention relates to a brake slip control apparatus fed with auxiliary energy for use in a vehicular hydraulic brake system. The brake system comprising a master cylinder assembly actuatable by the brake pedal and incorporating a master cylinder piston and an assigned prechamber, with a supply bore and with the delivery of auxiliary energy into the working chamber of the master cylinder. At least one positioning tube which is axially slidable between stops and sealed relative to the bore in the master cylinder housing is arranged on the secondary side of the master cylinder piston. The positioning tube has a larger external diameter than the master cylinder piston and is centrically guided through the shank or the actuating rod of the master cylinder piston in a sealed relationship thereto. The master cylinder piston is caused to assume a defined position on actuation of the brake pedal and in the event of the secondary side of the master cylinder piston being applied by auxiliary energy during slip control.

In a brake slip control apparatus fed with auxiliary energy for use in a vehicular hydraulic brake system (brake system with anti-lock control) of the above-referenced type priorly known from German laid-open print No. 23 43 545, the master cylinder assembly is designed with a tandem master cylinder whose pedal-side (stepped) piston comprises a piston rod with a pedal-side one-piece, circumferential flange, the external diameter of the circumferential flange being larger than the external diameter of the assigned master cylinder piston. Intermediate of a brake valve assembly for supply of auxiliary energy, which brake valve assembly is actuatable by the brake pedal and inserted upstream of the tandem master cylinder, and the circumferential flange is a travel-responsive spring which, on brake application, supplies the vehicle operator with a feedback or feeling for braking. During a normal braking action, the auxiliary energy is supplied through the brake valve of the brake valve assembly to the prechambers of the tandem master cylinder and from there to the secondary side of the master cylinder pistons. When acted upon by auxiliary energy, the circumferential flange having a larger diameter than the master cylinder piston and providing sealing to the outside provides that in normal operation both master cylinder pistons are kept in the their initial position, the circumferential flange bearing against an axial stop close to the pedal and formed fast with the housing. The hydraulic pressure fluid delivered to the secondary side propagates through axial fill bores at the master cylinder piston to the working chambers of the cylinder and from there, subjected to dynamic control, to allocated wheel brake cylinders. On failure of the auxiliary-energy supply system, the circumferential flange of the master cylinder piston close to the pedal will no longer be held at its axial stop formed fast with the housing, so that both master cylinder pistons can move jointly in the actuating direction, the master cylinder performing its normal function then and actuating the wheel brake cylinders statically. What is a disadvantage in this known arrangement is the complicated design of the pedal-side master cylinder piston having an enlarged pedal-side circumferential flange of larger diameter. Since the piston is locked in its initial position during normal operation, there must be provided means in the form of a travel-responsive spring which gives the vehicle operator a good sense of braking. Inherently, the brake valve assembly itself does not suit this purpose. As the master cylinder piston is stationary during normal operation (and does not perform its normal function), whether said cylinder has any defective points (such as possible leakages in the area of the sleeve seal) cannot be detected during normal operation of the brake.

Furthermore, a vehicular brake system of the type at issue is known in U.S. Pat. No. 4,416,491, wherein on the secondary side of the master cylinder piston there is provision of a positioning piston which is axially slidable against an axial stop formed fast with the housing and which is sealed relative to the master cylinder housing, the positioning piston having a larger external diameter than the master cylinder piston and through which the master cylinder piston rod is centrically guided in a sealed relationship therewith, wherein on depression of the brake pedal and on application of the secondary side of the master cylinder piston with auxiliary energy during slip control, the pedal-side enlarged circumferential end of the master cylinder piston rod or a circumferential projection of a throttle valve assembly, which is possibly inserted upstream, is movable into engagement with an assigned pedal-side circumferential edge of the positioning piston such as to cause the master cylinder piston to assume a defined position during braking with slip control.

However, this known vehicular brake system has the disadvantage that during control action there is the inherent risk that, when braking is effected at low frictional values, the brake pedal will be displaced in the direction of the master cylinder so far until the booster piston abuts on the positioning tube.

It is an object of the present invention to improve upon the known positioning device such as to ensure on control action even under extreme conditions that the brake pedal assumes a position which is precisely defined beforehand.

SUMMARY OF THE INVENTION

This object is achieved according to the present invention in that an undular washer is arranged between the pedal-side end of the positioning tube and the step of the braking pressure generator isolating the master cylinder assembly from a hydraulic brake power booster, with the positioning tube being pressed against the undular washer on control action. The undular washer pressure-tightly closes an intermediate chamber provided between the master cylinder piston and the booster piston enclosed by the step.

Preferably, a spring is accommodated in the bore of the master cylinder assembly which acts upon the positioning tube in the direction of the brake pedal and urges the tube against the undular washer in the position of brake release, with radially extending openings or gaps being disposed between the pedal-side end surface of the positioning tube or a bushing rigidly coupled thereto and the lateral surface of the relaxed undular washer, which openings or gaps establish a pressure-fluid communication between the intermediate chamber and a port in the wall of the master cylinder that is connected to a return line.

Advantageously, a stationary collar or ring radially inwardly extending in the bore for the positioning tube is provided for retaining and guiding the positioning tube, the positioning tube comprising at its end close to the master cylinder a flange-shaped, radially outwardly extending head portion which, together with the ring and the bore, encloses an annular gap communication by way of a throttle bore with the annular chamber or prechamber, while a lip seal is cooperating with the head portion which permits the flow of pressure fluid into the annular gap.

In particular for reasons of better assembly, the part of the positioning tube close to the brake pedal is rigidly connected with a bushing, whose end close to the undular washer is furnished with a radially outwardly extending collar, on which the one end of the spring is abutting, while its other end abuts on the ring. In doing so, the undular washer encompasses the booster piston annularly and bears with its radially outer circumferential surface against the bore for the positioning tube.

The annular chamber formed between the cylindrical part of the positioning tube, the bore, the ring and the collar is in communication with the port of the return line, thus being ensured that the intermediate chamber is always filled with pressure fluid. In order to enable rapid flow of pressure fluid into the intermediate chamber in the position of brake release, a gap for the penetration of pressure fluid is arranged between the radially outer edge of the collar of the positioning tube or bushing and the bore.

BRIEF DESCRIPTION OF THE DRAWING

Further features, advantages and applications of the instant invention can be taken from the following description with reference to the accompanying drawing of an embodiment of this invention wherein the single FIGURE illustrates brake slip control apparatus in accordance with the present invention.

DETAILED DESCRIPTION

As is shown in the drawing, the brake system in accordance with the present invention comprises substantially a pedal-actuated elongated hydraulic braking pressure generator which, as a whole, is designated by reference numeral 1, an auxiliary-pressure source 2, a supply and pressure compensating reservoir 3 and electromagnetically actuatable two-way/two-position directional control valves 4 to 6, by way of which the wheel brakes and, respectively, the front and rear wheels are connected in three hydraulically isolated brake circuits. Valves 4 to 6 assume their opened position normally, that means as long as they are not excited. Besides, there is provision of a return line 10 leading from the front and the rear wheels to the compensating reservoir 3, which return line, however, is isolated form the wheel brake cylinders by means of three further two-way/two-position directional control valves 7 to 9 as long as these valves 7 to 9 are not excited.

In turn, the braking pressure generator 1 is composed of a hydraulic brake power booster 11 and a master cylinder assembly 12 as well as of a positioning device 13.

One brake circuit, that is the rear-wheel brake circuit 14, is connected directly to the brake power booster 11, while the two working chambers 15 and 16 of the master cylinder assembly 12, which is herein designed as a tandem master cylinder, are connected with each one front wheel by way of separate brake circuits 17 and 18. The two master cylinder circuits of a like arrangement are termed as static pressure-fluid circuits, while the rear-axle circuit is referred to as dynamic pressure-fluid circuit because in this circuit 14 the pressure is defined by the position of a control valve 19 which is pedal-actuated by way of rods 25 and which, depending on the displacement of a valve piston 20, allows more or less pressure out of the auxiliary-energy source 2 to enter into the booster chamber 21 and from there into the brake circuit 14.

The pressure build up in the booster chamber 21 on depression of a brake pedal 22 and introduced through the control valve 19, respectively, acts on the pistons 23, 24 of the master cylinder assembly 12 simultaneously and, what is easily comprehensible, has as a result development of braking pressure in the working chambers 15 and 16 of the two static brake circuits 17, 18 which lead to the front wheels. First, atmospheric pressure is still prevailing in two prechambers 26, 43 of the master cylinder assembly 12 because these chambers are in communication with the pressure-compensating reservoir 3 by way of a so-termed main valve 27 in the inactive position thereof, that is when the valve is not excited.

At each wheel of the vehicle equipped with the brake system in accordance with the present invention, there is arranged a sensor 28, 29, 30, 31 which is designed, for example, as an inductive pick-up for measuring data and which feeds information about the wheel rotational behavior into an electronic control unit. This control unit contains among other things an electronic combining logic in the form of hard-wired or programmed circuitries, such a microprocessors, and after evaluation of the sensor signals generates control commands which are delivered to the corresponding solenoid valves 4 to 9 and 27 by way of signal lines not shown.

Upon commencement of brake slip control, the main valve 27 changes over. This opens a pressure-fluid conduit 32 leading from the booster chamber 21 into the prechambers 26, 43 so that pressure fluid flows into the prechambers 26, 43. This pressure is supplied further through connecting channels 33, 34 to annular chambers 35, 36, inside the master cylinder assembly 12. From these chambers 35, 36 pressure will propagate through sleeve seals 37, 38 arranged at the periphery of the pistons 23, 24 and performing the function of non-return valves and will be introduced dynamically into the working chambers 15, 16 which are in communication with the wheel brakes of the front wheels.

The dynamically introduced pressure simultaneously results in resetting of a positioning tube 39 of the positioning device 13, whereby the pistons 23, 24 in the master cylinder assembly 12 will adopt a defined position in a known fashion.

Owing to the dynamic introduction of pressure fluid into the static brake circuits 17, 18 of the front wheels and into the annular chamber 36 which is of decisive importance for the resetting pressure exerted on the positioning tube 39, it is prevented that the working chambers 15 and 16 become empty due to slip control even in the event of frequent pressure decrease caused by discharge of pressure fluid by way of the switched-over valves 7 and 8.

In the event of a defect in the auxiliary-energy supply system 2, herein comprised of a pressure fluid pump 40 with the associated non-return valve 41 and of a pressure fluid accumulator 42, a pressure alarm circuit (not illustrated in greater detail) will respond, signal this condition to the electric control unit of the brake system and cause (depending on the magnitude of the residual pressure) partial de-activation or disconnection of the brake slip control. This pressure alarm circuit is necessary because the auxiliary energy is used also during normal braking without slip control for brake force boosting in the static pressure circuits 17, 18 and for braking pressure generation in the dynamic brake circuit 14.

Positioning tube 39 is sealed in relation to the bore 45 by means of a lip seal 44 and comprises a throttle bore 46, through which the pressure fluid which entered the annular gap 47 by way of the lip seal 44 is allowed to flow back to the annular chamber 36. When in its inactive position, the positioning tube 39 abuts with its bushing 48 on the undular washer 50 and, to this end, is acted upon by a compression spring 49 which in turn is supported on a step 51 of the bore 45 and on a ring (60). On the undular washer side of the bushing 48 or the positioning tube 39, there is a collar 63. A ring (60), radially inwardly extending from the bore 45, is provided for retaining and guiding the positioning tube 39. The positioning tube 39 has at the end close to the master cylinder 12 a flange-shaped, radially outwardly extending head portion 62. The head portion 62, ring 60 and the bore 45 enclose the annular gap 47.

The undular washer 50 acts as a ring seal, on the one hand, and as a valve spring, on the other hand. In the position of the positioning tube 39 illustrated in the drawing, gaps 52 extending in a radial direction are disposed between the undular washer 50, on the one hand, and the booster-side end surface of the bushing 48, on the other hand, through which gaps the annular chamber 53 (in which the compression spring 49 is contained) communicates with the intermediate chamber 54. Moreover, annular chamber 53 is connected to the return line by way of a port 55 and a pressure fluid line 56. When the annular chamber 36 is acted upon by pressure fluid under controlled pressure during braking pressure control, the higher pressure prevailing in the annular chamber 36 will displace the positioning tube 39 in the direction of the brake pedal 22, until its abuts together with the bushing 48 on the undular washer 50 and presses it to finally become flat to such effect that the latter, in the capacity of a circular-cylindrical ring seal, isolates the intermediate chamber 54 from the annular chamber 36, since then the radial gaps 52 do no longer act as pressure-fluid communications. The pressure fluid enclosed in the intermediate chamber 54 now acts as a hydraulic lock so that the booster piston 57 is not able to be displaced further in the actuating direction (in the direction of the master clinder piston 23).

The undular washer 50 is a circularly shaped metal plate, whose lateral surfaces comprise undulated elevations and indentations in a way such that the undular washer 50 slid in between two plane surfaces in conjunction with these plane surfaces forms a great number of radially extending channels or gaps 52. In the embodiment illustrated in the drawing, the two plane surfaces are formed by the circularly shaped end surface of the collar or the step 51 close to the master cylinder and by the pedal-side circularly shaped end surface of the bushing 48 of the positioning tube 39. Instead of the undular washer 50 described hereinabove, likewise a fan-shaped disc or a rubber disc or a plastic disc configured in the type of a ondular washer can be made use of. In any case, the disc arranged between the step 51 and the bushing 48 must be shaped such that the channels or gaps 52 are caused to disappear under axial load so that the disc will act like a sealing element with plane-parallel lateral surfaces.

What is claimed is:

1. A brake slip control apparatus fed with auxiliary energy for use in a vehicular hydraulic brake system, comprising a master cylinder assembly (12) actuatable by the brake pedal and incorporating a master cylinder piston (23) and an assigned prechamber (36), with a supply bore (34) and with the delivery of auxiliary energy into a working chamber (16) of the master cylinder, wherein at least one positioning tube (39) which is axially slidable between stops and sealed relative to a bore (45) in the master cylinder housing (12) is arranged on a secondary side of the master cylinder piston (23), said positioning tube having a larger external diameter than the master cylinder piston (23) and being guided centrically through the master cylinder piston (23) in a sealed relationship thereto, the master cylinder piston (23) being caused to assume a defined position on actuation of the brake pedal (22) and in the event of the secondary side of the master cylinder piston (23) being applied by auxiliary energy during slip control, wherein an elastic undular washer (59) is arranged between the pedal-side end of the positioning tube (39) and a step (51) of a braking pressure generator (1) isolating the master cylinder assembly (12) from a hydraulic brake power booster (11), wherein said positioning tube (39) is pressed against said undular washer (50) upon initiation of a slip control action to cause said undular washer (50) to cut off fluid communication between an intermediate chamber (54) provided between the master cylinder piston (23) and a booster piston (57) enclosed by the step (51).

2. A brake slip control apparatus fed with auxiliary energy as claimed in claim 1, wherein a ring (60) extends radially within said bore, and is provided for retaining and guiding the positioning tube (39), said positioning tube (39) comprising at its end close to the master cylinder a flange-shaped, radially outwardly extending head portion (62) which, together with the ring (60) and the bore (45), encloses an annular gap (47) communicating by way of a throttle device (46) with the annular chamber or prechamber (36), while a lip seal (44) cooperates with the head portion (62) which permits the flow of pressure fluid into the annular gap (47).

3. A brake slip control apparatus fed with the auxiliary energy as claimed in claim 2, wherein the end of the positioning tube (39) close to the brake pedal is rigidly connected with a bushing (48), whose end close to the undular washer (50) is furnished with a radially outwardly extending head portion (62), on which the one end of a spring (49) abuts, whose other end abuts on the ring (60).

4. A brake slip control apparatus fed with auxiliary energy as claimed in claim 3, wherein the undular washer (50) encompasses the booster piston (57) annularly and bears with its radially outer circumferential surface against said bore (45).

5. A brake slip control apparatus fed with auxiliary energy as claimed in claim 4, wherein the annular chamber (53) formed between the cylindrical part of the positioning tube (39), the bore (45), the ring (60) and the head portion (62) is in communication with a port (55) of a return line (56).

6. A brake slip control apparatus fed with auxiliary energy as claimed in claim 5, wherein a gap for the penetration of pressure fluid is arranged between the radially outer edge of a collar (63) of the bushing (48) and the bore (45).

* * * * *